(12) United States Patent
Ehrlich et al.

(10) Patent No.: US 6,873,968 B2
(45) Date of Patent: Mar. 29, 2005

(54) SYSTEM, METHOD AND COMPUTER PROGRAM PRODUCT FOR ON-LINE REAL-TIME PRICE COMPARISON AND ADJUSTMENT WITHIN A DETACHABLE VIRTUAL SHOPPING CART

(75) Inventors: Marc Alan Ehrlich, Somers, NY (US); Reiner Kraft, Gilroy, CA (US); Joann Ruvolo, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 755 days.

(21) Appl. No.: 09/780,812

(22) Filed: Feb. 10, 2001

(65) Prior Publication Data

US 2002/0111873 A1 Aug. 15, 2002

(51) Int. Cl.[7] .............................................. G06F 17/60
(52) U.S. Cl. .............................. 705/26; 705/27; 705/20
(58) Field of Search .............................. 705/26, 27, 20

(56) References Cited

U.S. PATENT DOCUMENTS

| | | | |
|---|---|---|---|
| 5,745,681 A | 4/1998 | Levine et al. | 395/200.3 |
| 5,774,670 A | 6/1998 | Montulli | 395/200.57 |
| 5,790,974 A | 8/1998 | Tognazzini | 701/204 |
| 5,826,242 A | 10/1998 | Montulli | |
| 5,960,411 A | 9/1999 | Hartman et al. | |
| 5,966,697 A * | 10/1999 | Fergerson et al. | 705/26 |
| 6,076,071 A * | 6/2000 | Freeny, Jr. | 705/26 |
| 6,101,482 A | 8/2000 | DiAngelo et al. | |

FOREIGN PATENT DOCUMENTS

WO    WO 99/66438    * 12/1999    ............... 17/60

OTHER PUBLICATIONS

Ichoose, http://web.archive.org/web/200000105064034/http://www.ichose.com, dated Jan. 5, 2000, 9 pages.*
Mack, Ann, Choose Me, Ichoose alerts e-shoppers to better offers, Brandweek, Apr. 10, 2000.*
UDDI Executive White Paper, pp. 1–3, Sep. 6, 2000.

* cited by examiner

*Primary Examiner*—Jeffrey A. Smith
*Assistant Examiner*—Mark Fadok
(74) *Attorney, Agent, or Firm*—Samuel A. Kassatly

(57) ABSTRACT

A price comparison and adjustment system can be used in the context of an Internet environment. The system is generally comprised of a server based browser, a shopping cart manager, an extract and verify module, a validation module, and a counter offer module. The system provides an Internet shopper with a convenient method for comparison shopping online while allowing the shopper control over the comparison-shopping search, which also enables a host merchant to counter offer prices at rival merchant's web sites. The system also provides information about rival merchants to the host merchant, which allows the host merchant to develop an optimal pricing and counter offer strategy. The system creates a portable virtual shopping cart that allows the Internet user to browse rival merchants without the appearance of leaving the host merchant's web site, and further allows the shopper to quickly return to the host merchant's web site to purchase items in the virtual shopping cart.

25 Claims, 5 Drawing Sheets

SYSTEM, METHOD AND COMPUTER PROGRAM PRODUCT FOR ON-LINE REAL-TIME PRICE COMPARISON AND ADJUSTMENT WITHIN A DETACHABLE VIRTUAL SHOPPING CART

CROSS-REFERENCE TO RELATED APPLICATION

This application relates to co-pending U.S. patent application, Ser. No. 09/780,636, titled "System and Method for Automating Electronic Commerce Transactions Using a Virtual Shopping Cart", which is assigned to the same assignee as the present application, which is filed concurrently with the present application, and which is incorporated herein by reference in its entirety.

FIELD OF THE INVENTION

The present invention relates generally to electronic commerce (e-commerce) over a network, such as the Internet, for items offered on several web sites. More particularly, the invention relates to a system and associated method for creating a portable web shopping cart for on-line real-time price comparison between the prices of items offered by a host merchant and those offered by rival merchants and subsequent adjustment of the host merchants' prices to compete with rival merchants.

BACKGROUND OF THE INVENTION

The World Wide Web (WWW) is comprised of an expansive network of interconnected computers upon which businesses, governments, groups, and individuals throughout the world maintain inter-linked computer files known as web pages. Shoppers navigate these pages by means of computer software programs commonly known as Internet browsers. Due to the vast number of WWW sites, many web pages have a redundancy of information or share a strong likeness in either function or title. The vastness of the unstructured WWW causes shoppers to rely primarily on Internet search engines to retrieve information or to locate businesses. These search engines use various means to determine the relevance of a shopper-defined search to the information retrieved.

The authors of web pages provide information known as metadata within the body of the hypertext markup language (HTML) document that defines the web pages. A computer software product known as a web crawler systematically accesses web pages by sequentially following hypertext links from page to page. The crawler indexes the pages for use by the search engines from information about a web page as provided by its address or Universal Resource Locator (URL), metadata, and other criteria found within the page. The crawler is run periodically to update previously stored data and to append information about newly created web pages. The information compiled by the crawler is stored in a metadata repository or database. The search engines search this repository to identify matches for the shopper-defined search rather than attempt to find matches in real time.

A typical search engine has an interface with a search window where the shopper enters an alphanumeric search expression or keywords. The search engine sifts through available web sites for the shopper's search terms, and returns the search of results in the form of HTML pages. Each search result includes a list of individual entries that have been identified by the search engine as satisfying the shopper's search expression. Each entry or "hit" may include a hyperlink that points to a Uniform Resource Locator (URL) location or web page.

Electronic shopping (or e-shopping) has been gaining popularity as the popularity of the World Wide Web increases. E-shopping continues to evolve from a means of providing an easy way of accessing (and publishing) information on the Internet to a virtual marketplace where almost every type of merchandise can be traded, as it is in the physical world. As more retail businesses market their merchandise over the WWW, it will become more important for a business to distinguish itself from the competition. If the retail business has an established brand name, it will have an advantage over strictly Internet retailers when creating a web store. The brand name recognition translates to consumer recognition for an on-line presence, significantly lowering the retail business' cost of entry into Internet retailing, compared to the cost of entry for a competitor that operates solely on the Internet. In addition, it is possible for the retail business to combine the best of Internet retailing with standard retailing by joining its web store's ease of access, ease of use, and significant inventory features with its delivery and distribution channels and proximity of its physical locations to the shoppers. For example, a consumer in a Barnes and Noble store might be offered kiosk access to the Barnes&Noble.com® web site if the consumer is unable to locate a book in the store. Alternatively, a shopper on Home Depot's web site might be allowed to purchase a yard of gravel which could then be delivered to their home from their local Home Depot retail store.

Strictly Internet enterprises might not be able to offer such advantages; however, their advantage over regular retailing competition arises from this very same distinction. Purely Internet enterprises are not encumbered with the expense of running and maintaining costly physical assets such as retail stores, and thus they can devote their attention to improving their customer's Internet or on-line experience. The brand proposition for these strictly Internet enterprises is focused on creating a distinctively better, more complete, and more efficient on-line shopping experience to promote greater traffic to their sites, thus further establishing their brand equity.

Examples of Internet merchants attempting to establish exclusive shopping feature advantages to promote their brands are illustrated for example, in U.S. Pat. No. 5,960,411 to Hartman et. al, which describes a system that permits a shopper to check out with a single mouse-click, U.S. Pat. No. 5,897,620 to Walker et al., which describes a system that allows a shopper to submit a conditional purchase offer for an airline ticket at a set price and further allows airlines to decide whether to accept or reject the proposed ticket price. Each of these patents evidences the importance that a strictly Internet merchant places on establishing an exclusive, unique shopping experience for its consumers in an attempt to further promote its brand and attract and retain on-line shopping at its web site.

An outgrowth of the popularity of Internet or on-line shopping is the advent of on-line comparison shopping engines. Price comparison tools, often promoted by web portals such as Yahoo!®, or AltaVista®, or shopping services such as Bluefly.com or MySimon.com are essentially web search engines that allow a user to search a population of web merchants for the lowest price for a desired item. These search engines allow a shopper to enter a key word which is usually a description of the desired item. In response to the shopper's query, the search engines return a set of corresponding web-based matches listing the vendors or vendors' web sites that offer the desired item. Typically, these searches are undertaken on an item by item basis and the search is performed against a set of retailers determined by the search engine owner. The population of the merchants searched may be open-ended as in the case of search engines that use agents or "bots" to scan the web for such items or closed as in search engines that search only across a group of subscribed merchants.

The advantage of Internet comparison shopping engines for Internet retailers is the prospect of increased incremental sales as shoppers choose the merchant's products as a result of a favorable price comparison. Unfortunately, this sales increase comes at the expense of web-site traffic. As more shoppers turn to comparison shopping engines, fewer shoppers visit the actual Internet retailer.

Therefore, the Internet retailer loses the ability to generate sales of ancillary items often acquired by a shopper visiting their site and most importantly, the merchant's brand equity and visit or "hit" count at the merchant's web site is eroded. The effort expended on building a unique shopping experience might thus be threatened by the emergence of these one-stop shopping engines. As such, Internet retailers are challenged to address the convenience offered by such tools in such a way that shoppers are still encouraged to visit their web sites.

In response to this challenge, services such as IChoose.com, and Clickthebutton.com® have appeared which permit a shopper to engage in comparison shopping after having identified an item of merchandise to purchase at an Internet retailer's site. In the case of IChoose.com, the price comparison takes place at the merchant's web site. Software is provided to the on-line shopper that detects when the shopper is about to make a purchase and quickly scans the IChoose.com database to provide a last-minute price check for the items being purchased. IChoose.com also offers an analogous product to Internet merchants that detects when a customer is on the verge of exercising the IChoose.com option to leave their site for a better price and lets the merchant counteroffer with a lower price quote to retain the shopper.

There are several disadvantages to IChoose.com approach. The customer has access only to items found by IChoose.com's comparison shopping engine. Depending on the scope of IChoose.com's price comparison, the search engine may miss some merchants and as a result, the customer may not be offered the lowest price available. In addition, the merchant does not know which rival it is bidding against; it simply knows that a customer is about to leave and that it needs to "beat" a certain designated price in order to retain that customer.

Clickthebutton.com® offers a service that is generally similar to IChoose.com. The Clickthebutton.com® software installs a button on the user's computer screen or "desktop". While shopping in an Internet store, the user may select an item and simply click the button on their desktop, generating a client-based request to a Clickthebutton.com® server hosting a proprietary real time shopping comparison engine. The shopping comparison engine returns to the shopper prices along with pointers to the web sites with comparable items.

The Clickthebutton.com® approach also presents several disadvantages. Since a third party does the comparison-shopping, the customer does not know which merchants the shopping engine checked. As a result, the customer may not be offered the lowest price available for the desired item either because the comparison search was biased toward subscribing merchants or because the comparison search was not comprehensive. In addition, the merchant is afforded no opportunity to counteroffer against lower prices.

In the foregoing examples of current Internet comparison shopping systems, the Internet merchant is not offered significant value by the comparison shopping engine even though the shopper performs price comparisons while at the merchant's Internet web site. Since comparison-shopping is done by an unknown third party that may or may not be performing an unbiased or comprehensive search, the comparison-shopping feature provided by IChoose.com or Clickthebutton.com® might not offer the best possible comparison shopping experience for the customer. In addition, these services present a distinct disadvantage to the merchants because they either do not provide a counter offer option, or only provide the counter offer option based on the limited set of comparison prices generated by the comparison-shopping engine used by these services.

A solution is clearly needed that allows a shopper to leave the merchant's site after filling their virtual shopping cart, then browse the WWW in any way the shopper wishes for a lower priced item. The shopper would still retain the ability to quickly purchase the items in the virtual shopping cart from the original merchant. Additionally, the solution should allow the merchant to counter offer against an identified lower priced item upon request by the shopper. For the merchant's protection, the request should reveal not only the lower price but also the merchant offering the lower price. In addition, the implementation of the solution should be relatively straightforward and easy for the customer to use, while at the same time being vigilant of web-based countermeasures employed by competing merchants. The need for such a price comparison and adjustment system for Internet-based retailing has heretofore remained unsatisfied.

SUMMARY OF THE INVENTION

It is therefore an object of the present invention to present a system and associated method for on-line, real-time price comparison and adjustment that satisfy the foregoing need. The present invention overcomes the shortcomings of existing systems by enabling a web-based portable shopping cart which, in one embodiment, is equipped with a clickable option such that an on-line shopper may "detach" the shopping cart and its contents from the current merchant's web site (i.e., the web site being browsed).

The shopping cart may be detached either by launching it in a separate browser window or by converting it from a navigable web site to a "framed" web site (for example, by using Netscape® Frames technology) so that the shopping cart's contents persist in a shopping frame while the shopper continues to navigate the WWW. In either case, the shopping cart and its content persist on the shopper's computer screen in a portable fashion as the customer visits competitor's web sites to browse for lower prices on the items in their cart. In a preferred embodiment, the shopping cart "belongs" to the original or host merchant, i.e., only items from the host merchant are placed in the shopping cart for purchase. As the customer browses the WWW in search of lower price items, the items in the cart are compared to those found at rival merchant's web sites.

The shopping cart may, in another embodiment, offer links to competitor sites in one or more of the navigable frames to facilitate "window shopping" by the customer. In a further embodiment of the invention, selecting an Internet store to browse triggers a search for items in that store comparable to those in the customer's persistent shopping cart. The customer clicks on a button in the portable cart if a lower price is found for the item in the cart. The present system notifies the host merchant of the lower-price item and presents the opportunity to counter-offer against the rival merchant.

If the host merchant is unable to match or underbid the rival merchant's price, the item may be removed from the cart. The removal of an item from the shopping cart could be automatic if the host merchant cannot or would not match the competitive price. Alternatively, the customer is given the opportunity to make final decision as to whether or not the item should be deleted from the cart, since the consumer might opt to pay the host merchant's higher price for various personal reasons, such as the convenience of buying from one merchant and avoiding separate delivery charges. The shopping cart persists as long as other items remain in it. As used herein, persistence of the cart signifies an association of this cart with the host merchant in either memory or persistent storage.

The method for allowing the host merchant to observe the indicated lower price may take a variety of forms. One simple approach is by screen scraping, i.e., by examining the HTML file of the web page where the lower priced merchandise is found. Screen scraping provides several advantages: it is easy to implement; it reveals merchandise, price, and the rival merchant's identity; and it is essentially immune to web-based countermeasures employed by the rival merchant.

Thereafter, when the shopper has finished his or her shopping session, the system of the invention provides the opportunity to purchase the contents of the portable shopping cart. In a further embodiment of the invention, the shopper is returned to the host merchant's site prior to purchasing the contents of the shopping cart, and is given the option to complete the transaction or to continue shopping on the merchant's web site.

The persistent shopping cart provides the shopper with a convenient method for comparison shopping online while allowing the shopper control over the comparison-shopping search. The shopper is able to search extensively for lower prices using their preferred comparison shopping engines and visiting discount web sites as desired without limit. Since the original shopping cart is persistent, the shopper may return quickly to the host merchant's web site to transact the purchase of items in the shopping cart when better offers are not found at other merchant's sites.

Compared to existing shopping engines, the system of the present invention provides several advantages for the merchant: the host merchant is now aware of rival merchants' prices and identities, and the host merchant now has the ability to selectively counteroffer a lower price. By returning the shopper to the host merchant's web site, the host merchant's shopping experience appears to persist throughout the shopper's comparison shopping excursion, providing the shopper with the sense that he or she has never left the host merchant's web-store. This extension of the merchant's shopping experience enhances the host merchant's brand image and provides an opportunity to make additional sales to the shopper.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE PREFERRED EMBODIMENTS

Figure 1:
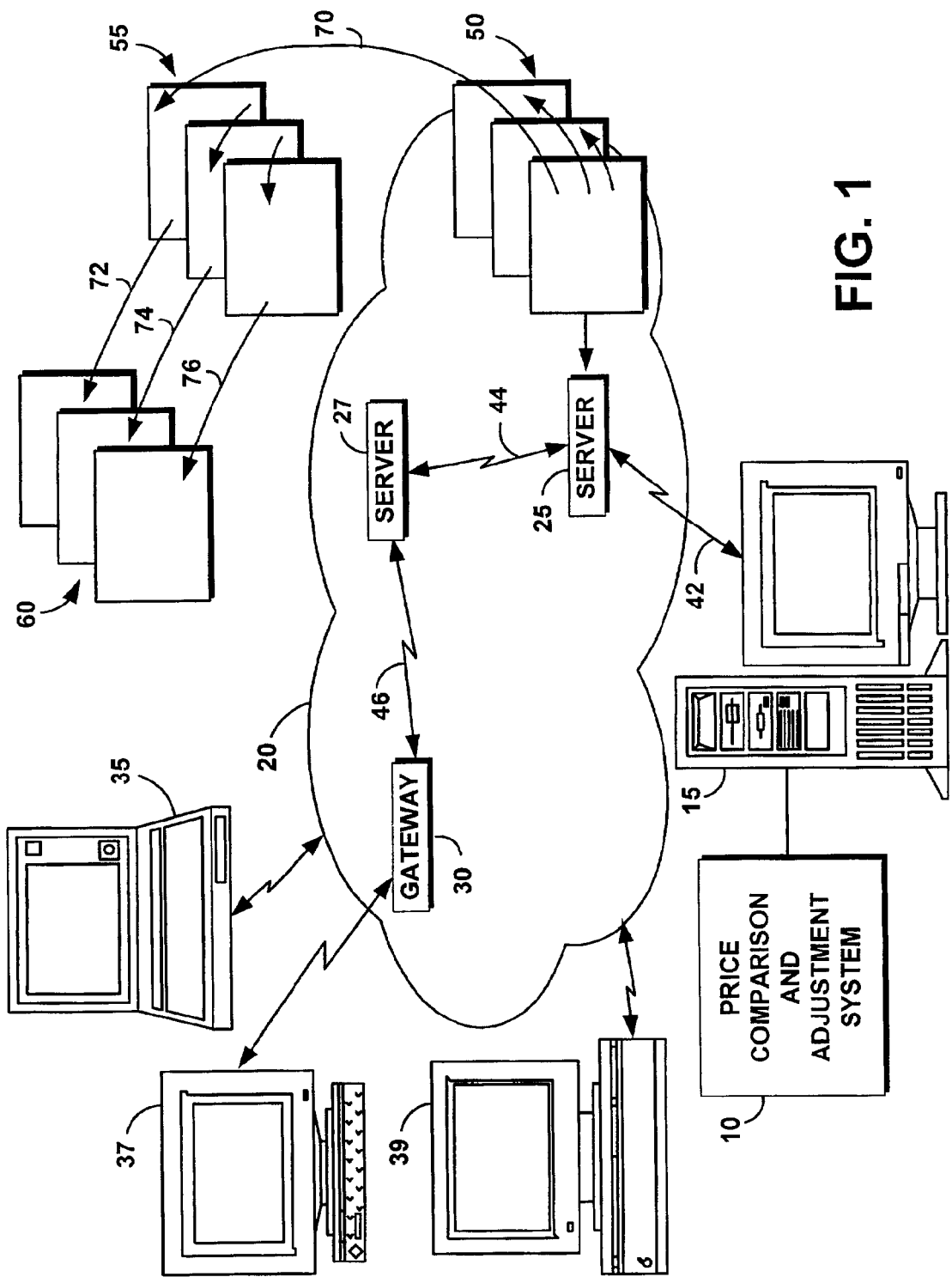
FIG. 1 is a schematic illustration of an exemplary operating environment in which a price comparison and adjustment system and associate method of the present invention may be used.

The following definitions and explanations provide background information pertaining to the technical field of the present invention, and are intended to facilitate the understanding of the present invention without limiting its scope:

Crawler: A program that automatically explores the World Wide Web by retrieving a document and recursively retrieving some or all the documents that are linked to it.

E-business, e-shopping, or e-commerce transactions: Business transactions conducted online using the Internet or another communications network.

Host merchant: The initial or original merchant whose site the shopper is browsing. The virtual shopping cart, if it exists, is associated with this host merchant.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

HTTP (HyperText Transfer Protocol): A protocol most often used to transfer information from World Wide Web servers to browsers.

Internet: A collection of interconnected public and private computer networks that are linked together with routers by a set of standard protocols to form a global, distributed network.

Screen-scraper: A piece of software used to automate interaction between two computer systems through the terminal interface (designed for human use) of one of those systems. Typically, the screen scraper interacts with terminal emulation software to generate input to and process output from the "host" system through terminal screens. When screen-scrapping web pages, terminal emulation software is not normally used. Typically, a web page is obtained via an HTTP request. This HTML page can then be manipulated by a software program, and, if requested by a web browser, the page would be rendered to the user. The software would search for certain tags/keywords or text of interest (e.g., "Model number" or "Price").

Search engine: A remotely accessible World Wide Web tool that allows shoppers to conduct keyword searches for information on the Internet.

Server: A software program or a computer that responds to requests from a web browser by returning ("serving") web documents.

Web browser: A software program that allows shoppers to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the shopper. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client—server hypertext distributed information retrieval system.

FIG. 1 portrays the overall environment in which a price comparison and adjustment system 10 according to the present invention may be used. The system 10 includes a software or computer program product that is typically embedded within, or installed, at least in part, on a host server 15. Alternatively, the system 10 can be saved on a suitable storage medium such as a diskette, a CD, a hard drive, or like devices. While the system 10 will be described in connection with the WWW, the system 10 can be used with a stand-alone database of documents that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Shoppers, such as remote on-line shoppers are represented by a variety of computers such as computers 35, 37, 39, and can query the host server 15 for the desired information.

The host server 15 is connected to the network 20 via a communications link such as a telephone, cable, or satellite link. The servers 25, 27 can be connected via high-speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
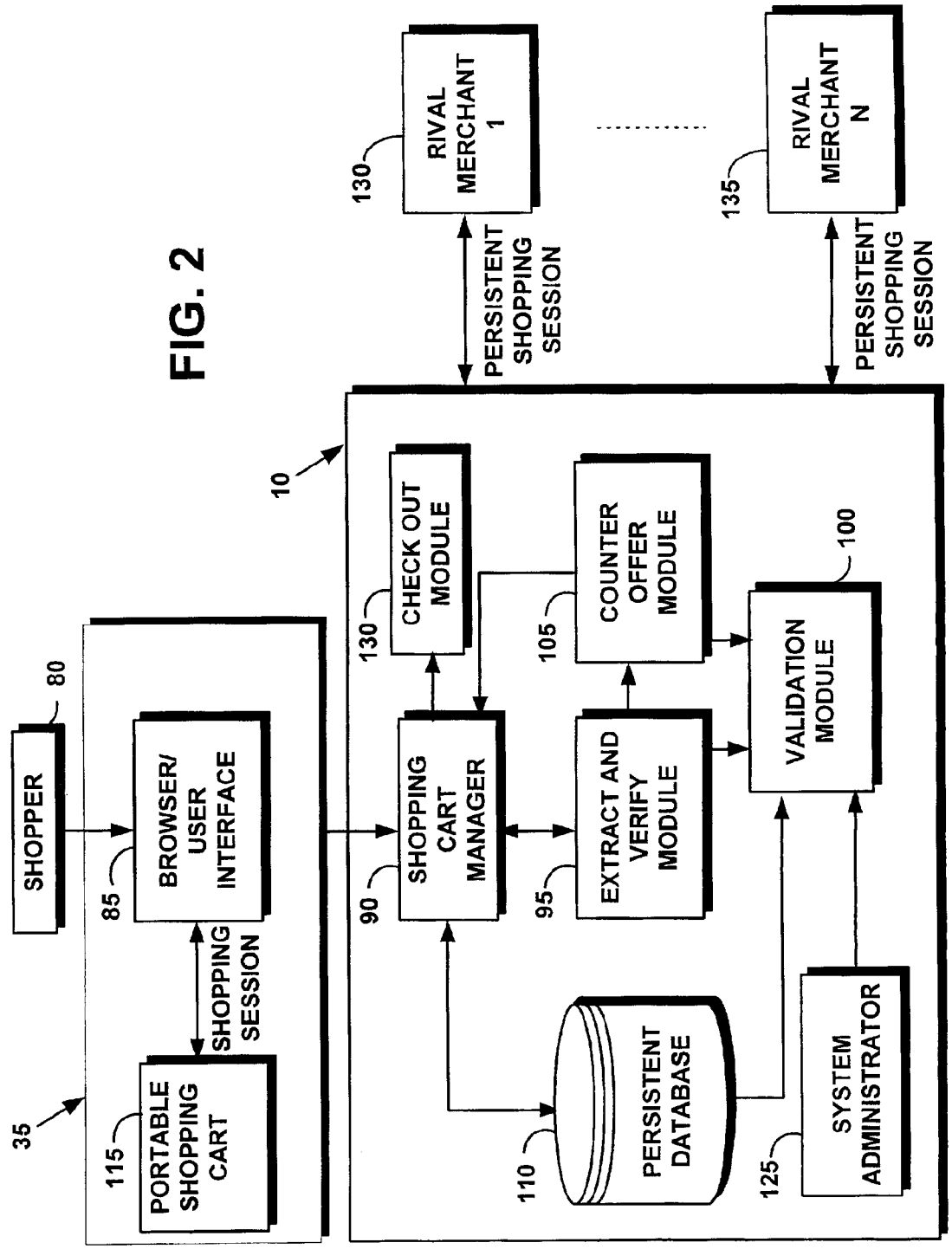
FIG. 2 is a more detailed block diagram of the price comparison and adjustment system of FIG. 1.

FIG. 2 illustrates the high-level architecture showing the price comparison and adjustment system 10 in use, in the context of an Internet environment by a shopper 80. The system 10 is generally comprised of a server-based browser 85, a shopping cart manager 90, an extract and verify module 95, a validation module 100, a counter offer module 105, a persistent database 110, the shopping carts 115, a system administrator 125, and a checkout module 130.

The persistent database 110 stores information about the host merchant's items (merchandise or service), rival merchants' information, and the contents of the shoppers' portable shopping carts 115, as the shoppers 80 browse the WWW for lower prices.

The shopping carts 115 are created and managed by the shopping cart manager 90, and are the agents by which the shoppers 80 interact with the host merchant. A shopping cart 115 can exist in either a detached or saved state. As used herein, a detached state indicates that the shopping cart 115 is portable and available to the shopper 80 as the shopper 80 browses the WWW. A saved state indicates that the shopper 80 has interrupted or halted the shopping session, yet has chosen to retain the items within the shopping cart 115 for later use, review, or purchase.

A cart item represents a single item in the shopping cart 115. The content of the shopping cart 115 is dynamic in that it can be readily modified to reflect updated information such as counter-offers. As an example, additional items can be added to the shopping cart 115, and existing items can be deleted therefrom.

A cart item contains but is not limited to the following fields:

Item number, which is the number used to represent the cart item;

Item description, which is the description of an item and is comprised of item description codes such as UN/SPSC, the United Nations Standard Products and Services Codes;

Price, which is the price of the item quoted by the host merchant;

Rival bid (or offer), which is the lower price offered by a rival merchant; and

Merchant ID, which is the identifier of the merchant offering the rival bid.

The item information data structure contains information that the host merchant maintains about each item that it offers for sale, specifically the pricing strategy for counter offering against rival bids. Item information includes, for example, the current list price of an item, the lowest price the host merchant will counter offer against a rival bid, the average price for which the item is sold. The average price takes into account the host merchant's price, competitive prices including previous rival bids, and the host merchant's counter offers. Item information is stored in the persistent database 110.

The host merchant's information data structure, stored in the persistent database 110, maintains records of known rival merchants (1 through N), which allows the host merchant to monitor rival merchants. Information maintained on rival merchants includes the frequency that shoppers initiate comparison shopping at specific rival merchants' servers, the frequency that the rival merchants underbid the host merchant's prices, and the amount, if any, that the rival merchants underbid the host merchant's price.

By monitoring rival merchants and their pricing strategies, the system 10 allows the host merchant to tailor a counter offer strategy to match those of the rival merchants. For example, the host merchant might be willing to bid more competitively against a rival merchant that sells similar ancillary goods or that targets the same group of customers as the host merchant. Conversely, the host merchant might not be as aggressive in counter offering against a rival merchant that is a specialty store focusing on a niche market.

The server based browser 85 of FIG. 2 manages the persistent shopping session between the shopper 80 (using for example computer 35), the system 10, and the rival web sites visited by the shopper 80 via the host merchant's web site. The rival web sites visited during the persistent shopping session are represented by rival merchant 1 (130) through rival merchant N (135).

The shopping session is activated when a shopper 80 with a detached shopping cart 115 leaves the host merchant's web site. The persistent shopping session is deactivated when the shopper 80 returns to the host merchant's web site, and either purchases the items in the shopping cart 115, deletes items in the shopping cart 115, or abandons the shopping cart 115. The shopping cart 115 preferably resides on the shopper's browser (or user interface) 85.

The shopping cart manager 90 is responsible for performing all shopping cart 115 actions. The supported shopping cart 115 actions (or commands) include, for example:

Detach action, which writes the shopping cart 115 to the persistent database 110 and marks the shopping cart 115 as detached;

Checkout action, which initiates the purchase operation for the items in the shopping cart 115;

Save action, which writes the shopping cart 115 to the persistent database 110 and marks the shopping cart 115 as saved;

Resume action, which retrieves the previously saved shopping cart 115 from the persistent database 110 and deletes the persistent copy;

Delete action, which removes the in-memory copy and/or the persistent shopping cart 115;

Add item action, which creates a cart item from the input data and adds that item to the shopping cart 115;

Update item action, which retrieves the designated cart item and updates the requested fields;

Delete item action, which deletes the designated cart item; and

Compare item action, which determines whether a rival merchant is underbidding the host merchant's price for an item.

When the shopper 80 locates a lower priced item at a rival merchant's web site, the extract and verify module 95 compares the price of the item in the portable shopping cart 115 with that of the rival merchant. The price comparison is triggered either by the shopper 80 at the rival merchant's web site, or by the host merchant when a rival merchant's web site is recognized. The host merchant then ensures the validity of the rival merchant's site by activating the validation module 100.

The validation module 100 monitors rival merchants and their prices. Information on rival merchants and their prices is collected using "screen scraping" which "lifts" the desired information about the rival merchant and their prices from the readout on the screen by examining the html document or the display buffer for that web site. This process may be undetectable by the rival merchant, making countermeasures by the rival merchant significantly difficult.

When the shopper 80 identifies a lower price at a rival merchant's web site, the validation module 100 first verifies that the host merchant has the rival merchant in the merchant information database. If not, the validation module 100 notifies the host merchant's system administrator 125 of the new rival merchant. Human intervention may be required to prevent the price comparison and adjustment system 10 from being victimized by fraudulent merchants. If the new rival merchant is viable, a merchant info entry is created. The validation module 100 also monitors rival merchant pressures such as the frequency of visits by shoppers 80 to that merchant, the number of times the rival merchant underbids the initial price provided by the host merchant for an item, and the amount the host merchant was underbid. The system 10 uses this information to assist the host merchant to determine the counter offers to be made.

The validation module 100 activates the counter offer module 105 when a competing merchant underbids the host merchant's price for a cart item. The counter offer module 105 retrieves the item information for the designated cart item and the merchant information for the rival merchant.

Using the lowest price identified in the cart item, the counter offer module 105 determines the leverage the host merchant 120 has in beating the rival merchant's price. If the host merchant can underbid the rival merchant's price, the counter offer module 105 uses the stored information about the item and the rival merchant to calculate the minimum counter offer required without dropping below the host merchant's minimum price threshold. If the counter offer is within acceptable parameters, the shopping cart manager 90 updates the cart item with the counter offer.

If the lowest price provided by counter offer 105 to the shopping cart manager 90 is still greater than the rival merchant's price, the shopping cart manager 90 can automatically delete the designated cart item from the shopping cart 115. Alternatively, the customer is given the opportunity to make final decision as to whether or not the item should be deleted from the shopping cart 115, since the consumer might opt to pay the host merchant's higher price for various personal reasons, such as the convenience of buying from one merchant and avoiding separate delivery charges.

In operation and with reference to FIGS. 2, 3A, 3B, and 3C, the shopper 80 selects several items for purchase at the host merchant's web site. The shopper 80 then leaves the host merchant's web site to browse the Internet for lower prices at the web site of a rival merchant 1 (130).

Leaving the host merchant's web site activates, the server based browser 85, which manages the persistent shopping session for the host merchant. The shopping cart manager 90 detaches the shopping cart 115 at step 140, initiating the shopping session and creating a navigable frame that can be viewed on the shopper's computer screen as the shopper 80 navigates from the rival merchant 130 to the rival merchant 135 on the Internet. The shopper 80 searches the rival merchant's (130) site for items similar to the item in the shopping cart 115, and identifies a competing product at step 145. In an alternative embodiment of the system 10, selecting an Internet store to browse at step 145 triggers a search for items in that store comparable to those in the shopping cart 115.

When a lower priced item is identified, the shopper 80 clicks a button in the portable shopping cart 115 to request a counter offer at step 150 from the host merchant 120. The shopping cart manager 90 then requests the extract and verify module 95 at step 155 to retrieve the cart item information from the shopping cart 115 data structure. The request for a counter offer can apply to all the items in the shopping cart 115 or, in another embodiment, each item (or a sub-group of items) in the shopping cart 115 can have a button to request a counter offer for this item (or the sub-group of items).

At step 160, the extract and verify module 95 calls upon the validation module 100 to retrieve the rival merchant information and then, at step 165, verifies that the rival merchant and rival offer are valid. If the rival merchant does not currently exist in the host merchant's information data structure, the administrator 125 is notified. The administrator 125 then ascertains the validity of the rival merchant, and if the rival merchant appears suspicious, i.e., the rival merchant is offering unreasonably low prices, the shopper 80 may be notified at step 170, and is given the opportunity to browse other merchants at step 175, and the shopper 80 is returned to step 145. Otherwise, the shopper 80 may return to the host merchant site for check out at step 225 of FIG. 3B.

Figure 3A:
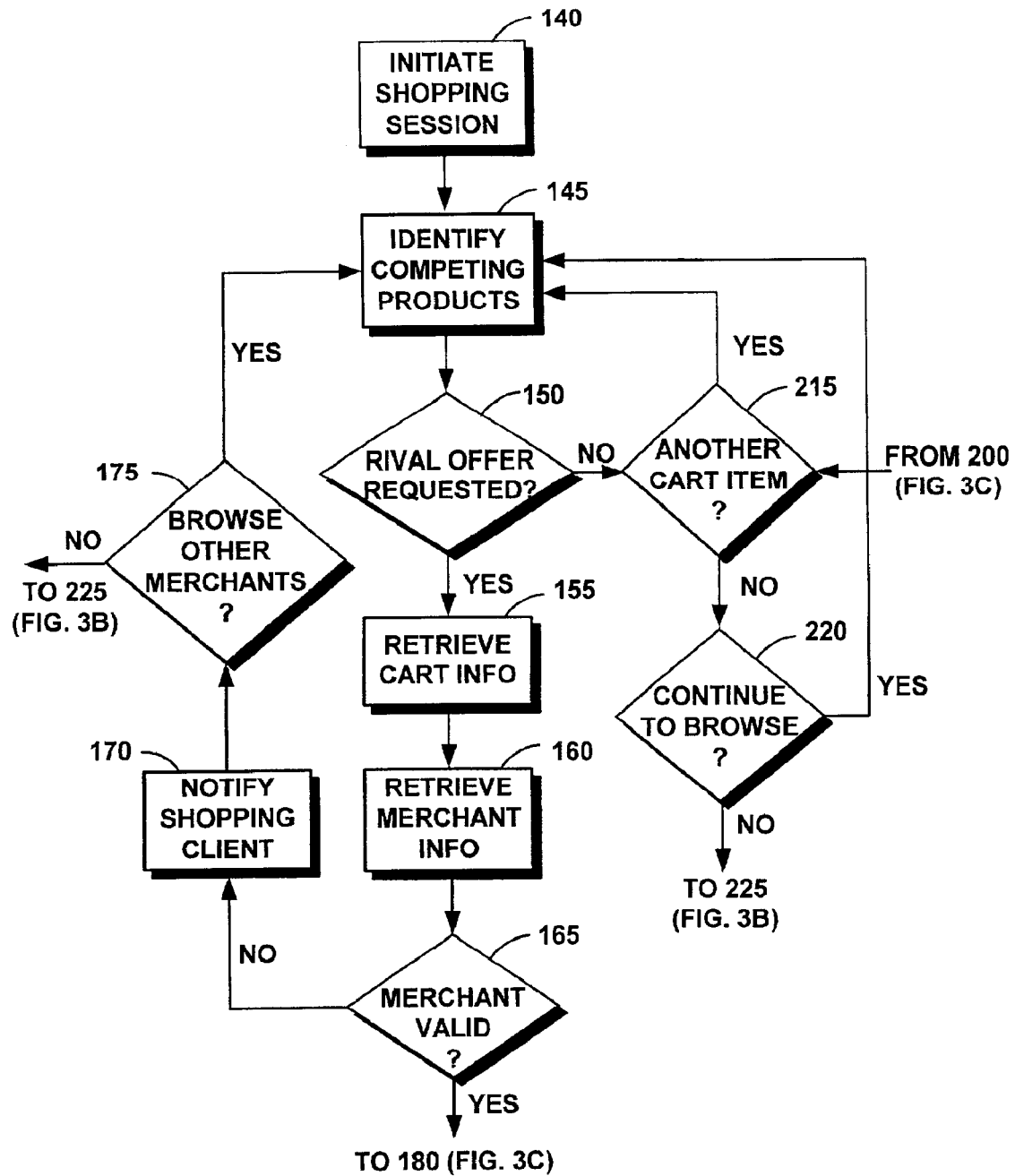
FIG. 3 is comprised of FIGS. 3A, 3B, 3C, and depicts a flow chart that illustrates the operation of the price comparison and adjustment system of FIGS. 1 and 2.
Figure 3B:
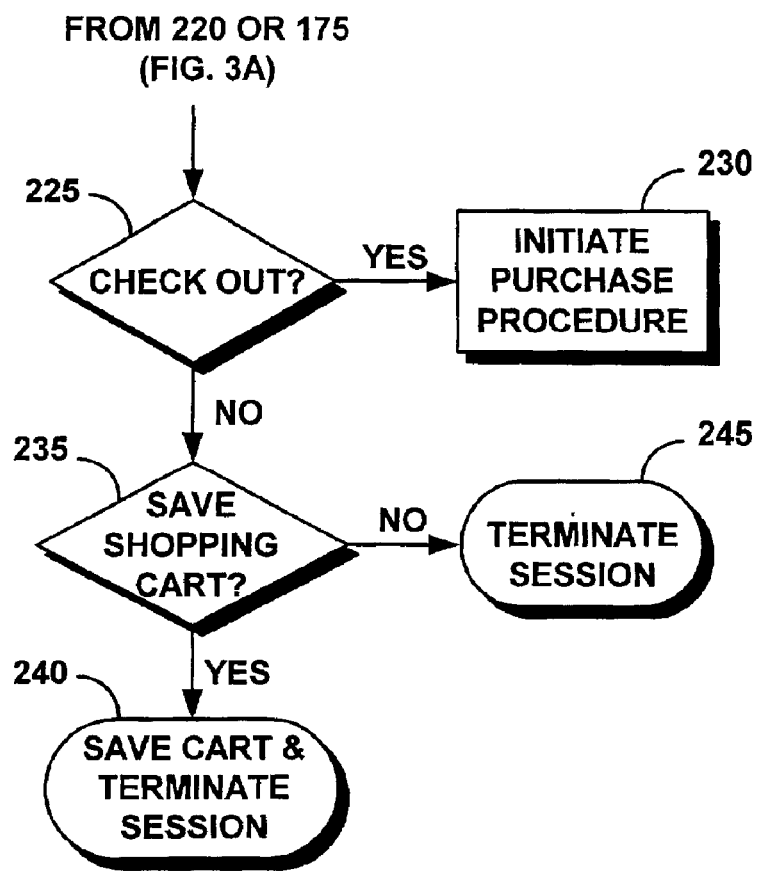
Figure 3C:
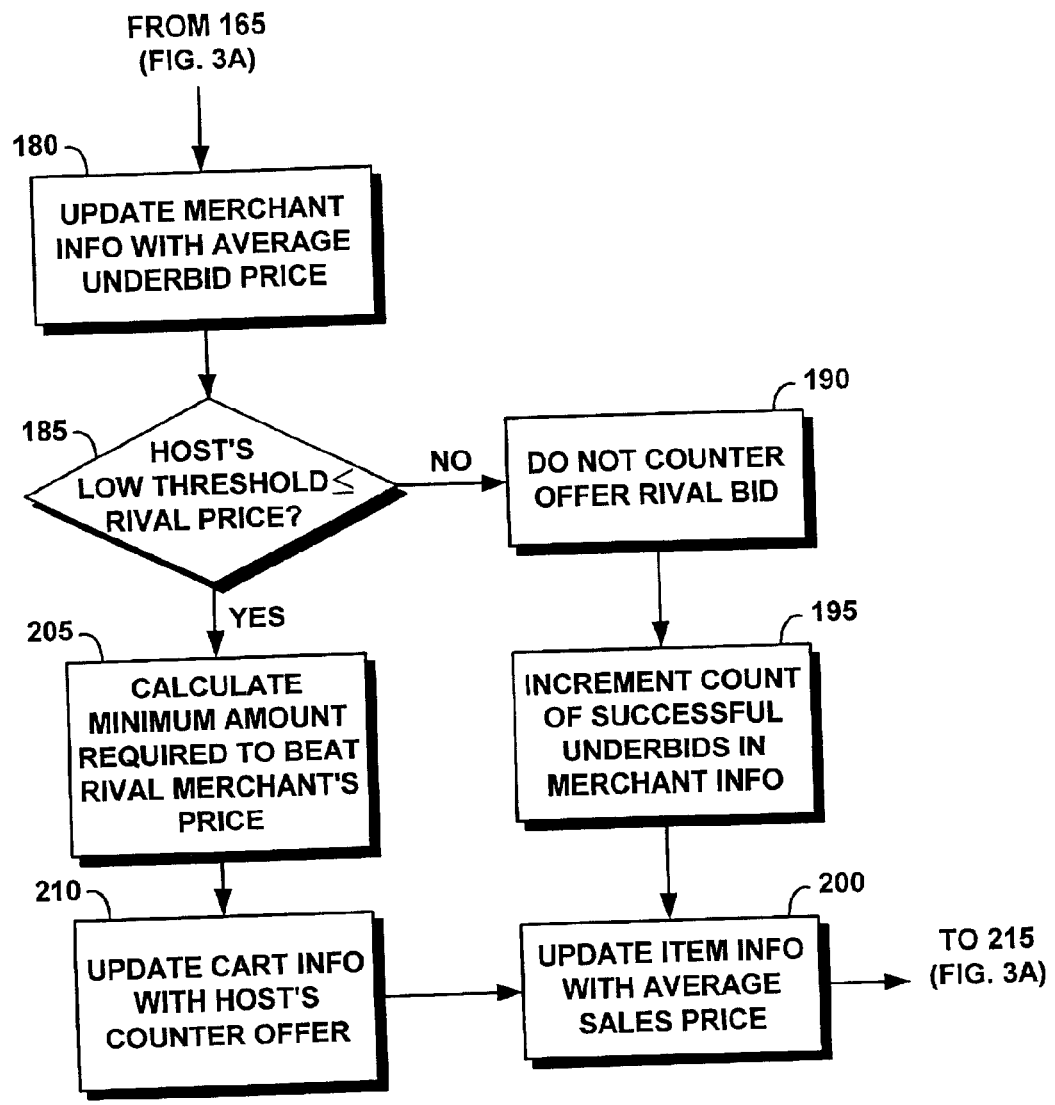

If at step 165 the rival merchant is recognized by the validation module 100, the system 10 proceeds to step 180 in FIG. 3C, where the validation module 100 automatically prepares a counter offer, such as by varying the item's average price relative to the underbid price of the rival merchant 130. The extract and verify module 95 compares the rival merchant's 130 price with the host merchant's price at step 185. If the host merchant's low threshold price exceeds the rival merchant's price, the host merchant will not counter offer the merchant's price (step 190).

As described earlier, the shopping cart manager 90 may automatically delete the underbid item from the shopping cart 115, or request further instructions from the shopper 80. The validation module 100 increments the count of successful underbids by rival merchant 130 in the merchant information data structure at step 195, and may optionally update the host merchant's average price for the underbid item at step 200.

If at step 185 the host merchant's low threshold price is below the rival merchant's price, the counter offer module 105 calculates the minimum price reduction required to beat the rival merchant's price (step 205). The shopping cart manager 90 then updates the cart item information with the host merchant's counter offer at step 210. The item's average price may also be updated in the item info data structure at step 200.

The system 10 then returns to decision step 215 of FIG. 3A, where it automatically inquires if all the items in the shopping cart 115 have been analyzed as described earlier. As long as there remains a single item in the shopping cart 115 that has not been analyzed, the system 10 proceeds to decision step 150, and repeats the steps as described earlier. Alternatively, the system 10 may be configured so that the user can manually requests a counter offer for each item individually in the shopping cart 115 at step 215.

If at decision step 215 the system 10 determines that no items remain in the shopping cart 115 after the counter offer process is completed, the shopping cart manager 90 deletes the shopping cart 115. Otherwise, the shopper 80 has the option at step 215 of continuing to browse at step 220, for lower prices with the system 10 repeating steps 145 through 215 as described earlier, or returning to the host merchant 120 with the shopping cart 115 at step 225 of FIG. 3B.

When the shopper 80 returns to the host merchant 120 at step 225 (FIG. 3B), the shopper 80 may choose to check out, initiating the purchase procedure at step 230, so that the host merchant completes the purchase transaction. If the shopper 80 does not wish to purchase the items at the current time, the shopper 80 may request, at step 235, that the shopping cart manager 90 save the shopping cart 115 for a later shopping session (step 240), or simply terminate the shopping session (step 245).

It is to be understood that the specific embodiments of the invention that have been described are merely illustrative of certain applications of the principle of the present invention. Numerous modifications may be made to the price comparison and adjustment system and associated method described herein without departing from the spirit and scope of the present invention. Moreover, while the present invention is described for illustration purpose only in relation to the WWW, it should be clear that the invention is applicable as well to other networked stores.

What is claimed is:

1. A system for managing an on-line virtual shopping cart which contains information about an item offered by a host merchant, comprising:

a shopping cart manager that creates the virtual shopping cart and that detaches the virtual shopping cart prior to, or upon a shopper leaving a site of the host merchant to a different merchant's site;

an extract and verify module that performs a comparison between a host merchant's offer for the item and an offer from the different merchant's site;

a counter offer module that selectively requests a counter offer from the host merchant relative to the item;

a validation module that automatically prepares a counter offer relative to an underbid offer from the different merchant's site; and the shopping cart manager automatically and selectively updates the item information in the virtual shopping cart to reflect the host merchant's counter offer, so that when the shopper returns to the host merchant's site for checkout, the shopper acquires the item at the host merchant's counter offer.

2. The system of claim 1, wherein the validation module assesses the validity of the different merchant.

3. The system of claim 2, further comprising a persistent database that stores information about the host merchant's item, the underbid offer, and the virtual shopping cart.

4. The system of claim 2, further including a checkout module.

5. The system of claim 1, wherein the item information includes any one or more of:

on item number, which is the number used to represent the item;

an item description, which is the description of an item;

a price, which is the price of the item quoted by the host merchant;

a rival offer, which is the offer made by the different merchant;

a merchant identifier, which is the identifier of the different merchant.

6. The system of claim 3, further including a browser that manages a persistent shopping session at the different merchant's site.

7. The system of claim 3, wherein the shopping cart manager is responsible for performing any one or more of the following actions;

detach action, which writes the shopping cart to the persistent database and marks the shopping cart as detached;

checkout action, which initiates a purchase operation of the item offered by the host merchant;

save action, which writes the shopping cart to the persistent database and marks the shopping cart as saved;

resume action, which retrieves a previously saved shopping cart from the persistent database;

delete action, which removes a previously saved copy of the shopping cart;

add item action, which creates and adds a item to the shopping cart;

update item action, which retrieves a designated cart item and updates corresponding information fields;

delete item action, which deletes the designated cart item;

compare item action, which determines whether the different merchant has underbidded the host merchant's offer for the item.

8. The system of claim 1, wherein the shopping cart is in any one of the following states: a detached state, or a saved state.

9. The system of claim 2, wherein the persistent database includes information about rival merchants, which allows the validation module to monitor the rival merchants; and wherein the information maintained on the rival merchants includes any one or more of:
  frequency that shoppers initiate comparison shopping at specific rival merchants;
  frequency that the rival merchants underbid the host merchant's offer;
  amounts by which a rival merchant has underbid the host merchant's offer.

10. A method of managing on on-line virtual shopping cart which contains information about an item offered by a host merchant, comprising:

automatically initiating a shopping session by creating the virtual shopping cart and by detaching the virtual shopping cart prior to, or upon a shopper leaving a site of the host merchant to rival merchant's site;

performing a comparison between a host merchant's offer for the item and an offer from the rival merchant's site;

the host merchant automatically preparing a counter offer relative to an underbid offer from the rival merchant's site; and the host merchant automatically and selectively updating the item information in the virtual shopping cart to reflect the host merchant's counter offer, so that when the shopper returns to the host merchant's site for checkout, the shopper acquires the item at the host merchant's counter offer.

11. The method of claim 10, further comprising assessing the validity of the rival merchant.

12. The method of claim 11, further comprising storing information about the host merchant's item, the rival merchant's offer, and the virtual shopping cart.

13. The method of claim 12, wherein creating the virtual shopping cart comprises performing any one or more of the following actions:

detach action, which writes the shopping cart to the persistent database and marks the shopping cart as detached;

checkout action, which initiates a purchase operation of the item offered by the host merchant;

save action, which writes the shopping cart to the persistent database and marks the shopping cart as saved;

resume action, which retrieves a previously saved shopping cart from the persistent database;

delete action, which removes a previously saved copy of the shopping cart;

add item action, which creates and adds an item to the shopping cart;

update item action, which retrieves a designated cart item and updates corresponding information fields;

delete item action, which deletes the designated cart item;

compare item action, which determines whether the rival merchant has underbidded the host merchant's offer for the item.

14. The method of claim 10, wherein if the rival merchant's offer is more competitive than the host merchant's offer, presenting the host merchant with an opportunity to counter-offer the rival merchant's offer.

15. The method of claim 14, wherein, if the host merchant is unable to make a counter-offer, allowing the shopper who initiates the shopping session to remove the item from the virtual shopping cart.

16. The method of claim 15, wherein upon termination of the shopping session, providing the shopper with an opportunity to purchase the host merchant's item.

17. The method of claim 16, wherein upon termination of the shopping session, returning the shopper to the host merchant's site.

18. The method of claim 17, wherein activating the shopping session is initiated when the shopper leaves the host merchant's site.

19. The method of claim 18, further comprising deactivating the persistent shopping session when the shopper returns to the host merchant's site.

20. A computer program product having executable instructions codes for managing on on-line virtual shopping cart which contains information about on item offered by a host merchant, comprising:

a first set of instruction codes for creating the virtual shopping cart and for detaching the virtual shopping cart prior to, or upon a shopper leaving a site of the host merchant to a different merchant's site;

a second set of instruction codes for selectively requesting a counter offer from the host merchant relative to the item;

a third of instruction codes for automatically preparing a counter offer relative to an underbid offer from the different merchant's site; and a fourth set of instruction codes for automatically and selectively updating the item information in the virtual shopping cart to reflect the host merchant's counter offer, so that when the shopper returns to the host merchant's site for checkout, the shopper acquires the item at the host merchant's counter offer.

21. The computer program product of claim 20, further comprising a fifth set of instruction codes for validating the different merchant.

22. The computer program product of claim 21, further comprising a persistent database that stores information about the host merchant's item, the different merchant's offer, and the virtual shopping cart.

23. The computer program product of claim 21, further comprising a sixth set of instruction codes for allowing the shopper to checkout from the host merchant's site.

24. The method of claim 20, wherein if the rival merchant's offer is more competitive than the host merchant's offer, the second set of instruction codes presents the host merchant with an opportunity to counter-offer the rival merchant's offer.

25. The method of claim 24, wherein, if the host merchant is unable to make a counter-offer, the second set of instruction codes allows the shopper who initiates the shopping session to remove the item from the virtual shopping cart.

* * * * *

UNITED STATES PATENT AND TRADEMARK OFFICE
CERTIFICATE OF CORRECTION

PATENT NO.    : 6,873,968 B2
DATED         : March 29, 2005
INVENTOR(S)   : Marc Alan Ehrlich et al.

It is certified that error appears in the above-identified patent and that said Letters Patent is hereby corrected as shown below:

Column 12,
Line 33, replace "on item" with -- an item --;
Line 45, replace "actions;" with -- actions: --;

Column 13,
Line 15, replace "on on-line" with -- an on-line --;

Column 14,
Line 21, replace "on on-line" with -- an on-line --;
Line 22, replace "on item" with -- an item --; and
Line 33, replace "a third of instruction" with -- a third set of instruction --.

Signed and Sealed this

Eleventh Day of October, 2005

JON W. DUDAS
*Director of the United States Patent and Trademark Office*